(12) United States Patent
Broadbent et al.

(10) Patent No.: US 6,303,663 B1
(45) Date of Patent: Oct. 16, 2001

(54) PROCESS FOR MAKING DEFOAMING COMPOSITIONS

(75) Inventors: Ronald W. Broadbent, Horsham; Dharmesh Chovatia, Bensalem, both of PA (US)

(73) Assignee: Cognis Corporation, Gulph Mills, PA (US)

( * ) Notice: Subject to any disclaimer, the term of this patent is extended or adjusted under 35 U.S.C. 154(b) by 0 days.

(21) Appl. No.: 09/277,708

(22) Filed: Mar. 26, 1999

(51) Int. Cl.$^7$ .......................... C01B 33/145; B01F 3/12; B01D 19/04
(52) U.S. Cl. .......................... 516/34; 516/117; 427/220; 428/405
(58) Field of Search .............................. 516/34, 117, 120; 427/419.5, 219, 220; 428/405

(56) References Cited

U.S. PATENT DOCUMENTS

| | | | |
|---|---|---|---|
| Re. 35,893 | 9/1998 | Valentine et al. | 424/489 |
| 2,441,098 | 5/1948 | Hyde et al. | 556/456 |
| 2,802,850 * | 8/1957 | Wetzel | 516/22 |
| 3,207,698 | 9/1965 | Liebling et al. | 516/117 |
| 3,235,509 | 2/1966 | Nitzsche et al. | 516/117 |
| 3,267,042 * | 8/1966 | Domba | 516/117 |
| 3,388,073 | 6/1968 | Domba | 516/117 |
| 3,634,288 * | 1/1972 | Youngs | 516/117 |
| 4,082,691 | 4/1978 | Berger | 510/120 |
| 4,101,443 * | 7/1978 | Rosen et al. | 516/120 |
| 4,339,342 | 7/1982 | Hempel et al. | 510/505 |
| 4,443,357 | 4/1984 | Maloney et al. | 516/117 |
| 4,590,237 | 5/1986 | Wuhrmann et al. | 524/480 |
| 4,655,961 | 4/1987 | Wuhrmann et al. | 516/120 |
| 5,728,895 | 3/1998 | Wiggins et al. | 568/601 |
| 5,843,336 | 12/1998 | Steelman | 516/117 |
| 5,858,279 | 1/1999 | Lunski et al. | 516/116 |

OTHER PUBLICATIONS

Notification of Transmittal of the International Search Report or the Declaration, Jun. 20, 2000.

\* cited by examiner

*Primary Examiner*—Daniel S. Metzmaier
(74) *Attorney, Agent, or Firm*—John E. Drach; Lance G. Johnson

(57) ABSTRACT

Silica is rendered hydrophobic by a catalyst-free, in-situ process that includes contact with a hydrophobing agent under vacuum at elevated temperature for a time sufficient to replace adsorbed water in the silica with the hydrophobing agent. The resulting dispersion of hydrophobic silica in an inert, liquid, hydrophobic carrier medium is then subjected to high shear forces for a time sufficient to produce a homogeneous dispersion of hydrophobic silica particles in a defoaming composition.

10 Claims, No Drawings

PROCESS FOR MAKING DEFOAMING COMPOSITIONS

FIELD OF THE INVENTION

The invention relates to a defoaming composition, its method of manufacture, and its method of use.

BACKGROUND TECHNOLOGY

Foam in paper mills and pulp mills may interfere with many processes and can affect the efficiency of refiners, pumps, screens, centrifugal cleaners, de-inking plants and water removal equipment. Foam will adversely affect final sheet formation, porosity, opacity, printability, smoothness, and plybond strength. Excessive foaming leads to loss of fibers and raw materials. Further, the drainage rate of a sheet on the wire can be affected by the presence of trapped air in a wet web. When a sheet or mat has a large number of trapped bubbles, the drainage rate is slowed because the water passing through the sheet or mat must also pass between the bubbles.

In many major industries and medicinal treatments, however, hydrophobic silica compositions are still the defoaming agents of choice. In the pulping and repulping of fibrous materials for the manufacture of waterlaid sheets such as paper, roofing felt, and the like, severe foaming problems can be encountered at several stages in the manufacturing process, particularly when natural organic materials having foaming properties are present when the fibrous mass is subject to strong agitation. Uncontrolled foaming can lead to decreased production, lower quality waterlaid sheet products, and other undesirable results. Foaming can also be encountered during bleaching, de-inking of broke or recycled pulp, cooking, washing, and draining operations, and the like. Various waste materials or waste or recyclable liquors can contain considerable amounts of foam and may require the addition of a defoamer.

Simethicone is a fluid antifoam or defoaming composition comprised of polydimethylsiloxane and silica suitably purified for its intended application. The preparation of liquid methylsiloxane polymers is delineated in U.S. Pat. No. 2,441,098, the disclosure of which is hereby incorporated by reference. The normal physical state of the simethicone Is a water white to grey translucent, viscous, oil-like liquid with a density of 0.965–0.970 grams/cubic centimeter having demonstrable immiscibility with water and alcohol.

The medically established therapeutic use for simethicone is as an ointment base ingredient, topical drug vehicle, skin protectant, but most particularly as an antigas and antiflatulent agent for human application as well as an antibloating agent for veterinary application.

Today's commercially available defoamers are capable of solving many industrial foam problems at surprisingly low concentrations, of as little as 0.0005% to about 3%, and preferably at concentrations of between 0.01–1%. Higher concentrations, although effective, become impractical. They are effective defoamers, particularly in aqueous systems wherein the foam is difficult to control, such as with industrial adhesive formulations.

Finely divided particles of silica have been used for foam inhibition in aqueous foaming systems. Typically, these silicas or silicates have been treated to make them hydrophobic, perhaps the most common treating agent being a silicone oil. The exact reasons for the effectiveness of the treated siliceous materials in aqueous foaming systems have not been fully or finally settled, but the scientific literature contains a considerable amount of theorizing on this subject.

The art has generally thought that both the hydrophobic fine silica and the silicone oil are necessary for foam inhibition in aqueous foaming systems. This conclusion is rationalized with the following theory: First, the hydrophobic silica is believed to be a foam breaker, i.e. the fine particles of hydrophobic silica help to rupture foam bubbles. Second, the silicone oil is essentially a carrier fluid which protects the filler particles and brings them into contact with the foam bubble surfaces.

The manufacture of hydrophobic silica and silicates has become an art in itself, and dozens of patents have issued regarding various aspects of this art. The structure of the substantially hydrophobic silica or silicate has not been determined with certainty. It is known from the literature that particulate siliceous materials having significant surface hydroxylation or surface silanol content can react chemically.

Two major methods are known in the art to produce the hydrophobic formulation. These methods are the "Dry Roast" method and the "In-Situ" method. In both methods, the silica is treated with silicone oil in amounts of about 5 to 40 wt. %. In the "Dry Roast" method, the silica as a dry powder is treated or impregnated with the silicone oil by heating, for example, at about 205° C. for about 4–6 hours to coat the silica with the silicone fluid. The resulting coated silica is then dispersed in a carrier fluid such as mineral oil, edible oil, silicone oil, fatty acid, fatty esters, polyalkoxylate esters, water, or mixtures thereof to form the defoaming agent.

In the second method, the "In-Situ" method, the silica dry product, the carrier and silicone fluid are mixed and heated at about 105°–140° C. for 4–6 hrs in the presence of a catalyst (e.g., an amine, diamine or ammonium carbonate) to form a homogenous mixture and convert the silica to hydrophobic particles and form the defoaming formulation in a single step.

Unfortunately, both methods have certain drawbacks. The dry roasting method requires large, expensive apparatus for processing commercially justifiable volumes of low density silica powders. In many instances, the cost of larger equipment effectively limits the throughput of the overall facility.

The conventional in-situ method offers the advantage of a liquid medium that counteracts the low density/high volume process limitations of the dry roast process at the cost of introducing catalyst/promoter residues into the composition. The adverse effects of such residues must, in turn, be counteracted by adding still other ingredients (such as an adjustment material) that may adversely limit the applicability of the resulting composition.

It would be desirable to have a process for making hydrophobic silica particles with a semi-batch or continuous step.

It would also be desirable to have a manufacturing process that was free of catalyst/promoter component residues in the hydrophobic particle dispersion product.

SUMMARY OF THE INVENTION

It is an objective of the invention to provide a defoaming composition that is free of catalyst/promoter residues and is highly effective with a consistent level of performance.

In accordance with these and other objectives of the invention that will become apparent from the description herein, defoaming compositions according to the invention include a carrier liquid having hydrophobic silica particles dispersed therein and made by a process that includes the step of:

contacting hydrophilic silica particles in the absence of a catalyst with a hydrophobing agent in an inert liquid medium under vacuum and at a temperature within the range from about 100–140° C. for a time of less than four hours to form a dispersion of hydrophobic silica particles in an inert, hydrophobic medium.

Hydrophobic silica particles made by the present process are free of catalyst/promoter residues typically found in silica rendered hydrophobic by in-situ processes and can be made hydrophobic faster than prior processes. This property allows the use of semi-batch or continuous size reducing equipment in the manufacturing process that increases throughput, decreases unit cost, and increases product performance.

DETAILED DESCRIPTION

Hydrophobic silica particles according to the invention are made by contacting finely divided, hydrophilic silica particles with a liquid hydrophobing agent in a hydrophobic liquid medium under vacuum and at elevated temperature. The dispersion can then be processed by suitable size reducing equipment to break up any oversize agglomerates and form a substantially homogeneous dispersion. The resulting dispersion is free of hydrophobing catalyst residues that make the product especially useful as a defoaming composition in a wide variety of industrial and medicinal applications.

The silica particles useful in the invention can be made by a variety of different processes, each of which typically forms an initial "primary" particle that agglomerates. These "ultimate" particle sizes typically have an average diameter within the range from about 5 to 50 μm. The average size of the agglomerated particles fed into the hydrophobing chamber will typically be within the range of 0.1–600 μm.

Suitable sources of silica particles useful in the present invention include aerogel silicas, silica xerogels, fumed silicas, and precipitated silica. The preferred silica particles for use as feed to the hydrophobing process of the invention is a precipitated silica exhibiting an average particle size within the range from 1 to about 20 μm, preferably within the range from about 3–10 μm, and a surface area within the range of about 100–500 $m^2/g$. Such precipitated silica products are commercially available from a variety of sources in a variety of particle size distributions.

As manufactured, the silica particles are hydrophilic and contain water molecules and air within their pores. The process of "hydrophobing" the silica is accomplished, according to the invention, by contacting the silica particles with a hydrophobing material under a vacuum for a time sufficient to displace water and air within the silica agglomerate structure. Water and air are liberated during the process and can be removed through exhaust lines that maintain the vacuum.

The process of the present invention forms a hydrophobic form of silica that does not necessarily involve surface reactions or bonding through surface hydroxyl groups to be effective. This flexibility permits a wider range of hydrophobing agents than would otherwise be available as well as significantly shorter times for the hydrophobing process. Provided that defoaming conditions are avoided that would desorb the hydrophobing agent from within the silica aggregate structure, the hydrophobic silica of the invention shows good utility as a defoaming agent without the complications normally associated with hydrophobing catalyst/promoter residues typically found in catalytic in-situ conversion processes.

The vacuum pressure used in the present process also provides a benefit to the final product by reducing or eliminating the effects of oxidation on the inert carrier material. Such effects are often seen as a distinctive darkening in the final product that may interfere with the potential applications for the defoaming composition.

Suitable hydrophobing agents for the present invention include liquid organosilicones (e.g., cyclic or linear polydimethyl silicones, silicone oils and organosilicones described in *The Encyclopedia of Polymer Science and Engineering*, v.15, pp. 234–265, the disclosure of which is incorporated herein by reference), hydrophobic alcohols of 18–50 carbon atoms, alkyl chlorosilanes (e.g., dimethylchlorosilane, trimethylchlorosilanes, or mixtures thereof), and polysurfactants such as those described in U.S. Pat. No. 5,728,895 (the disclosure of which is herein incorporated by reference). The preferred hydrophobing agents include liquid organosilicones and polysurfactants described in U.S. Pat. No. 5,728,895. An especially preferred hydrophobing agent is a liquid silicone polymer such as silicone oil containing polydimethylsiloxane.

Many liquid silicone polymers are commercially available. In general, useful liquid polymers have a kinematic viscosity within the range from about 50 to about 1,000 centistokes, preferably within the range from about 50 to about 500 centistokes.

The hydrophobing agent is used in an amount sufficient to make the hydrophilic silica particles hydrophobic. While the precise amount will depend on the particular apparatus and operating conditions, the hydrophobing agent is generally added in an amount up to about 10 wt % based on the weight of silica to be treated.

The liquid hydrophobing agent is contacted with the silica in the absence of a catalyst or other hydrophobing reaction promoter by adding the liquid hydrophobing agent to an inert liquid reaction medium in parallel with the silica or by mixing the hydrophobing agent into the inert reaction medium in advance. The silica would then be added with agitation or stirring at a rate sufficient to form a substantially homogeneous mixture. Depending on the characteristics of the inert reaction medium, the temperature of the reaction mixture may be heated to a temperature sufficient to maintain a mixable viscosity. The silica can be added at a temperature within the range of 18° (ambient) up to about 140° C.

The introduction of the silica into the inert reaction mixture can be accomplished by any of a number of methods. Preferably, the silica is introduced in a batch, semi-batch or continuous process through a vacuum suction line into a hydrophobing chamber operating under vacuum. Useful vacuum conditions include a pressure within the range from about 10 mm Hg to about 160 mm Hg, preferably a pressure within the range from about 60–120 mm Hg.

Once mixed, the "hydrophobing" mixture is heated under vacuum to a temperature sufficient to convert the silica into hydrophobic silica. The effective hydrophobing mechanism is believed to be a physical displacement of hydrophobing agent for entrapped water and air within the pores of the silica particulates. This is evidenced by the liberation of water during the hydrophobing process. It is possible, however, that there may be some absorption with chemical reaction between the silica and the liquid silicone polymer. Adsorbed hydrophobing agent according to the invention would be reflected by an ability to remove or "desorb" hydrophobing agent from isolated hydrophobic silica.

Temperatures useful for the hydrophobing step are within a range from about 100° C. to about 180° C., preferably within the range of about 115°–160° C., and even more preferably within a range from about 125°–150° C.

Within the contacting vessel and once the desired solution temperature is reached, the silica and hydrophobing agent are contacted with agitation for a time sufficient to produce hydrophobic silica particles. Such contact times are generally shorter than the four hours required for conventional dry hydrophobing or catalytic in-situ processes. The in situ process of the present invention has a contact time within the range from about 0.5 hour to about 3 hours, preferably a time within the range from about 1.5–2.5 hours.

Generally, contact between the silica and the hydrophobing agent is performed in an inert carrier material that will enhance or at least not interfere with the defoaming formulation performance. Suitable inert carriers for use with the present invention include a number of readily available organic liquids. Examples include: any of the polyglycols, liquid hydrocarbons (e.g., aliphatic, aromatic, or alicyclic oils, fuel oils, mineral oil, and particularly paraffin oils), naphthenic oil, fatty acids, cyclohexane, toluene, xylene, decane, mixtures of these materials, and a variety of liquids that will remain liquid over a wide range of temperatures for the type of defoaming formulation.

Additional agents can be added to the hydrophobing process provided that they do not interfere with or hinder the displacement of water from within the silica, or the additional agents can be added to the hydrophobic silica solution following the hydrophobing process. Examples of such additional agents include polymers other than liquid silicone polymers, fatty acids, glycerides of fatty acids, other carriers, and surfactants.

It is preferred that only the essential materials-hydrophobing agent, silica, and inert carrier-be present in the vessel used in the hydrophobing process of the invention. The use of other materials, e.g., catalysts, reaction promoters, or other agents designed to affect the interaction between the silica particles and the hydrophobing agent are preferably avoided as these agents will become part of the resulting defoaming composition. The presence of such additional agents can complicate use of the defoaming composition in some applications and processes, often necessitating the use of additional chemical agents to overcome the adverse effects of the additional agents. Thus, the materials present in the hydrophobing vessel preferably consist essentially of only the hydrophobing agent, the silica, and the inert carrier liquid. Even more preferably, the components present in the hydrophobing vessel consist of only silica, hydrophobing agent, and inert carrier.

The hydrophobic silica suspension can be subjected to various mixing, milling, grinding, or other processes to enhance the effectiveness of a formulation or defoaming product. Suitable processing includes passage through a high shear mixer such as that described in U.S. provisional application Ser. No. 60/083,234 (the contents of which is herein incorporated by reference), conventional homogenizers, media mills, jet mills, and other high shear mixing devices. The milling and/or mixing processes can be controlled by those with the existing level of skill in the art to make particle size ranges and distributions suited to the particular application for the hydrophobic particles of the invention. In general, particles milled to a size of less than 25 µm have been found useful for several defoaming formulations. Nothing in the present invention, however, prevents the use of larger sizes where larger particles of hydrophobic silica are desired.

After a substantially homogeneous composition is formed, the defoaming formulation is cooled, passed to an outlet port, and into a receiving vessel.

Defoaming formulations of the present invention are used in aqueous systems where foam generation must be suppressed or avoided for processing or product finish reasons. Typical applications include finishing baths for textile materials, fiber suspensions in paper manufacture, paper coating compositions, paints, water-borne adhesives, inks, polymer latexes, and food processing.

EXAMPLES

Examples 1–14

Samples of commercially available (PA-1, PA-2) and laboratory-made defoamer compositions were made and compared for defoaming performance in a conventional paint test. The laboratory samples include silica rendered hydrophobic by dry roasting with silicone oil for 6 hours at 205° C. (DR-A thru DR-G) as well as hydrophobing according to the present invention: no catalyst, 2 hrs at 130° C. (VAC-H thru VAC-L). The laboratory formulations were designed so that all samples had comparable concentrations and ingredients. In other words, test performance would be directly comparable and reflective of hydrophobing process effect.

The results are shown in Table 1.

TABLE 1

Defoaming Performance in Paint

| Ex | Defoamer | % Air | Bubble Break Time (secs) | Gloss 20D/60D |
|---|---|---|---|---|
| 1 | none | 7.8 | >300 | 22/68 |
| 2 | PA-1 | 1.9 | >300 | 27/72 |
| 3 | PA-2 | 2.0 | >300 | 26/71 |
| 3 | DR-A | 2.1 | >300 | 24/70 |
| 4 | DR-B | 2.3 | >300 | 25/70 |
| 5 | DR-C | 2.1 | >300 | 24/70 |
| 6 | DR-D | 1.9 | >300 | 23/69 |
| 7 | DR-E | 2.3 | 110 | 23/69 |
| 8 | DR-F | 1.7 | >300 | 25/70 |
| 9 | DR-G | 1.8 | >300 | 23/69 |
| 10 | VAC-H | 1.5 | 12 | 25/71 |
| 11 | VAC-I | 2.3 | 26 | 26/70 |
| 12 | VAC-J | 4.7 | >300 | |
| 13 | VAC-K | 2.2 | 40 | 25/69 |
| 14 | VAC-L | 1.9 | 21 | 24/67 |

The significant differences in Bubble Break times show that the defoaming compositions of the present process are more effective than either of the commercially available prior art products or defoaming compositions made by the slower dry roasting process.

Examples 15–20

Examples 15–20 compare the performance of two commercially available products (PA-1 and PA-2) with a defoaming composition containing silica rendered hydrophobic with a catalyzed, in-situ process which had been milled under high pressure (F), and two defoaming compositions with hydrophobic silica according to the present invention that had been milled with high pressure (G) and an in-line mixer (H).

The results are shown in Table 2.

TABLE 2

Defoaming performance in Paint

| Ex. | Defoamer | % Air | Bubble Break Time (secs) | Gloss 20D/60D |
|---|---|---|---|---|
| 15 | none | 9 | >300 | 28/69 |
| 16 | PA-1 | 2.5 | >300 | 38/78 |
| 17 | PA-2 | 2.5 | >300 | 38/77 |
| 18 | F | 1.8 | 6 | 34/77 |
| 19 | G | 1.9 | 7 | 45/81 |
| 20 | H | 1.7 | 5 | 35/78 |

The results of Table 2 show that hydrophobic silica according to the invention can be made into defoaming compositions with a faster, less energy intensive process and better performance than the prior hydrophobing processes and compositions.

Example 21

A polysurfactant such as those described in U.S. Pat. No. 5,728,895 was used instead of silicone oil as the hydrophobing agent on an equal weight percentage. The mix was treated for two hours at 140° C. with 80 mm Hg vacuum and milled to reduce the average particle size. The performance of the resulting composition can be seen in Table 3.

TABLE 3

Polysurfactant

| Ex. | Defoamer | % Air | Bubble Break Time (sec) |
|---|---|---|---|
| 21 | none | 10.4 | >300 |
| 22 | DEHYDRAN ® 2620 | 1.8 | 203 |
| 23 | polysurfactant | 1.4 | 86 |

DEHYDRAN®2620 is a defoaming composition that is made by Cognis, Inc. (Cincinnati, Ohio). It is a mixture polysiloxanes and surfactant in an inert carrier.

What is claimed is:

1. A process for making a defoaming composition containing hydrophobic silica particles by the steps consisting essentially of the steps of:

(a) contacting hydrophilic silica particles in the absence of an amine, diamine, or ammonium carbonate catalyst with a silicone oil hydrophobing agent in an inert liquid medium under vacuum and at a temperature within the range from about 100°–180° C. for a time within the range from 0.5 to 3 hrs to displace water or air within said silica particles by said hydrophobing agent and thereby form a dispersion of hydrophobic silica particles in an inert, hydrophobic medium; and (b) reducing the particle size of any oversized aggregates in said dispersion from step (a) and forming therefrom a substantially homogeneous dispersion of hydrophobic silica particles.

2. A process according to claim 1 wherein said hydrophilic silica particles are porous silica particles and/or agglomerates thereof made from a precipitated silica.

3. A process according to claim 1 wherein water is liberated during the contacting step.

4. A process according to claim 1 wherein said inert medium is selected from the group consisting of mineral seal oil, paraffin oil, polyglycols, fuel oil, naphthenic oils, fatty acids, cyclohexane, toluene, xylene, and dodecane.

5. A process according to claim 1 wherein said temperature is with the range from about 125° C. to about 140° C.

6. A process according to claim 5 wherein said contacting step is for a time of less than two hours.

7. A process according to claim 1 wherein the vacuum is at a pressure within the range from about 20 mm Hg to about 160 mm Hg.

8. A process according to claim 7 wherein said vacuum is at a pressure within the range from about 40–120 mm Hg.

9. The process of claim 1 wherein the hydrophobic silica particles are mixed, milled, or ground to reduce their particle size.

10. The process of claim 9 wherein the hydrophobic silica particles are milled to a size of less then 25 μm.

* * * * *